US012379095B1

(12) United States Patent
Li

(10) Patent No.: US 12,379,095 B1
(45) Date of Patent: Aug. 5, 2025

(54) NON-SLIP SHELL AND PORTABLE LIGHTING DEVICE

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 0 days.

(21) Appl. No.: 18/743,931

(22) Filed: Jun. 14, 2024

(30) Foreign Application Priority Data

Apr. 2, 2024 (CN) ......................... 202410392777.0

(51) Int. Cl.
*F21V 15/01* (2006.01)
*F21L 4/00* (2006.01)
*F21V 17/06* (2006.01)
*F21W 111/10* (2006.01)

(52) U.S. Cl.
CPC .............. *F21V 15/01* (2013.01); *F21L 4/005* (2013.01); *F21V 17/06* (2013.01); *F21W 2111/10* (2013.01)

(58) Field of Classification Search
CPC .......... F21V 15/01; F21V 17/06; F21L 4/005; F21W 2111/10
USPC .......................................................... 362/196
See application file for complete search history.

(56) References Cited

U.S. PATENT DOCUMENTS 5,235,636 A * 8/1993 Takagi ................ H04M 1/0202 379/422
5,982,881 A * 11/1999 Mischenko ......... H04M 1/0216 379/434
6,929,562 B2 * 8/2005 Kumamoto ............ A63B 60/02 473/319
7,092,520 B2 * 8/2006 Fuhrmann ........... H04M 1/0283 379/433.06
2018/0127048 A1 5/2018 Li et al.

* cited by examiner

*Primary Examiner* — James R Greece
*Assistant Examiner* — Hana S Featherly
(74) *Attorney, Agent, or Firm* — Maier & Maier, PLLC

(57) ABSTRACT

A non-slip shell and a portable lighting device. The non-slip shell includes: a shell body, where the shell body is provided with at least one hollow hole; an internal structural member, detachably arranged in the shell body; and a protruding part, firmly connected or detachably connected to the internal structural member and in one-to-one correspondence with the hollow hole, where a portion of the protruding part protrudes from the hollow hole and protrudes relative to an outer surface of the shell body. When a user holds the shell body, a hand can contact an exposed portion of the protruding part, thereby increasing a friction force between the hand and the shell body, making it easier for the user to firmly hold the shell body, helping to reduce a risk of accidental slip or out-of-control, and improving overall non-slip performance.

7 Claims, 3 Drawing Sheets

NON-SLIP SHELL AND PORTABLE LIGHTING DEVICE

CROSS-REFERENCE TO RELATED APPLICATIONS

The present application claims priority to Chinese Patent Application No. 202410392777.0, filed Apr. 2, 2024. The content of aforesaid application is incorporated herein by reference.

TECHNICAL FIELD

The present application relates to the technical field of portable lighting devices, and in particular to a non-slip shell and a portable lighting device.

BACKGROUND

A portable lighting device, such as a flashlight, usually includes a solid non-slip shell, a lamp bead, and batteries. The non-slip shell is designed to be comfortable and easy to carry. The lamp bead provides lighting with high brightness, energy saving, and long life. The portable lighting device provides reliable lighting solutions in outdoor activities, camping, emergencies, and daily life, and becomes a practical and necessary tool.

The non-slip shell of the portable lighting device is a metal non-slip shell and is made by a metal stamping process. The metal stamping process is a manufacturing method in which a metal plate is placed in a punch, and is pressed, cut, and formed by using a stamping die. This procedure usually includes die design, material loading, impact forming, and part separation. The stamping process may be used to produce various metal parts, such as a non-slip shell of an electronic device. Advantages of the stamping process are high efficiency and cost-effectiveness, and are suitable for mass production. This process is widely used in the manufacturing industry, which provides a reliable solution for producing metal parts with high consistency.

With the constant pursuit of user experience, texture and holding comfort of non-slip shells of electronic products, the design of the non-slip shells for improving the holding comfort becomes increasingly important. When the non-slip shell is manufactured by using the metal stamping process, due to the limitation of mould, a difficulty in forming, and cost-efficiency, and sandblasting, wire drawing, coating, and the like on the metal non-slip shell, it is difficult to make complicated non-slip textures on a surface of the metal non-slip shell, which leads to poor non-slip effect of the shell of the portable lighting device.

Therefore, the prior art needs to be improved and developed.

SUMMARY

A technical problem to be resolved in the present application is to provide a non-slip shell and a portable lighting device in view of the above defects in the prior art, to resolve a problem of poor non-slip effect of a shell of the portable lighting device in the prior art.

Technical solutions used to resolve the technical problem in the present application are as follows:

a non-slip shell, including:

a shell body, where the shell body is provided with at least one hollow hole;

an internal structural member, detachably arranged in the shell body; and a protruding part, firmly connected or detachably connected to the internal structural member and in one-to-one correspondence with the hollow hole, where a portion of the protruding part protrudes from the hollow hole and protrudes relative to an outer surface of the shell body.

The non-slip shell, where the shell body is a metal shell body.

The non-slip shell, where the shell body includes:

a front shell; and a rear shell, matching the front shell to enclose accommodating space, where the internal structural member is located in the accommodating space; and either the front shell or the rear shell is provided with at least one hollow hole.

The non-slip shell, where the front shell and the rear shell are an integrally formed structure.

The non-slip shell, where one side that is of the internal structural member and that is corresponding to the front shell is provided with at least one protruding part extending along a length direction of the internal structural member, and the protruding part is close to an edge of the internal structural member in a width direction.

The non-slip shell, where there are a plurality of protruding parts extending along the length direction of the internal structural member, and every two protruding parts form one group; and the two protruding parts are distributed along the width direction of the internal structural member.

The non-slip shell, where one side that is of the internal structural member and that is corresponding to the front shell is provided with at least one protruding part extending along the width direction of the internal structural member.

The non-slip shell, where there are a plurality of protruding parts extending along the width direction of the internal structural member, and every two protruding parts form one group; and the two protruding parts are distributed along the length direction of the internal structural member.

The non-slip shell, where a surface of the protruding part is a wave-like curved surface.

A portable lighting device, including the non-slip shell according to any one of the above.

Beneficial effect is as follows: the protruding part is provided on the internal structural member, and the hollow hole is provided on the shell body; and when the internal structural member and the shell body are assembled, the protruding part can be corresponding to the hollow hole and extend outward from the hollow hole beyond an outer surface of the shell body, thereby providing non-slip performance. When a user holds the shell body, a hand can contact an exposed portion of the protruding part, thereby increasing a friction force between the hand and the shell body, making it easier for the user to firmly hold the shell body, helping to reduce a risk of accidental sliding or out-of-control, and improving overall safety of a surface of a portable lighting device.

DETAILED DESCRIPTION OF THE EMBODIMENTS

To make the purpose, technical solutions, and effect of the present application more clear and definite, the present application is further described in detail with reference to the attached drawings and embodiments. It should be understood that specific embodiments described herein are only used to explain the present application, and are not used to limit the present application.

In the description of the present application, it should be understood that an orientation or positional relationship indicated by the term "center", "longitudinal", "transverse", "upper", "lower", "front", "back", "left", "right", "vertical", "horizontal", "top", "bottom", "internal", "external", or the like is based on an orientation or positional relationship shown in the accompanying drawings, and is merely for ease of describing the present application and simplifying the description, but does not indicate or imply that an apparatus or an element referred to must have a specific orientation or be constructed and operated in a specific orientation, and therefore cannot be understood as a limitation on the present application. In addition, the terms "first" and "second" are only used for descriptive purposes, and cannot be understood as indicating or implying relative importance or implicitly indicating a quantity of indicated technical features. Therefore, a feature limited by "first" or "second" may explicitly or implicitly include one or more features. In the description of the present application, unless otherwise specified, the meaning of "a plurality of" means two or more.

In the description of the present application, it should be noted that, unless otherwise expressly stipulated and defined, terms "install", "join", "connect", should be understood in a broad sense. For example, "connection" may be a firm connection, a detachable connection, or an integral connection; may be a mechanical connection, or an electrical connection; or may be a direct connection, an indirect connection through an intermediate medium, or a connection between two elements. A person of ordinary skill in the art can understand specific meanings of the terms in the present application based on specific situations.

Figure 1:
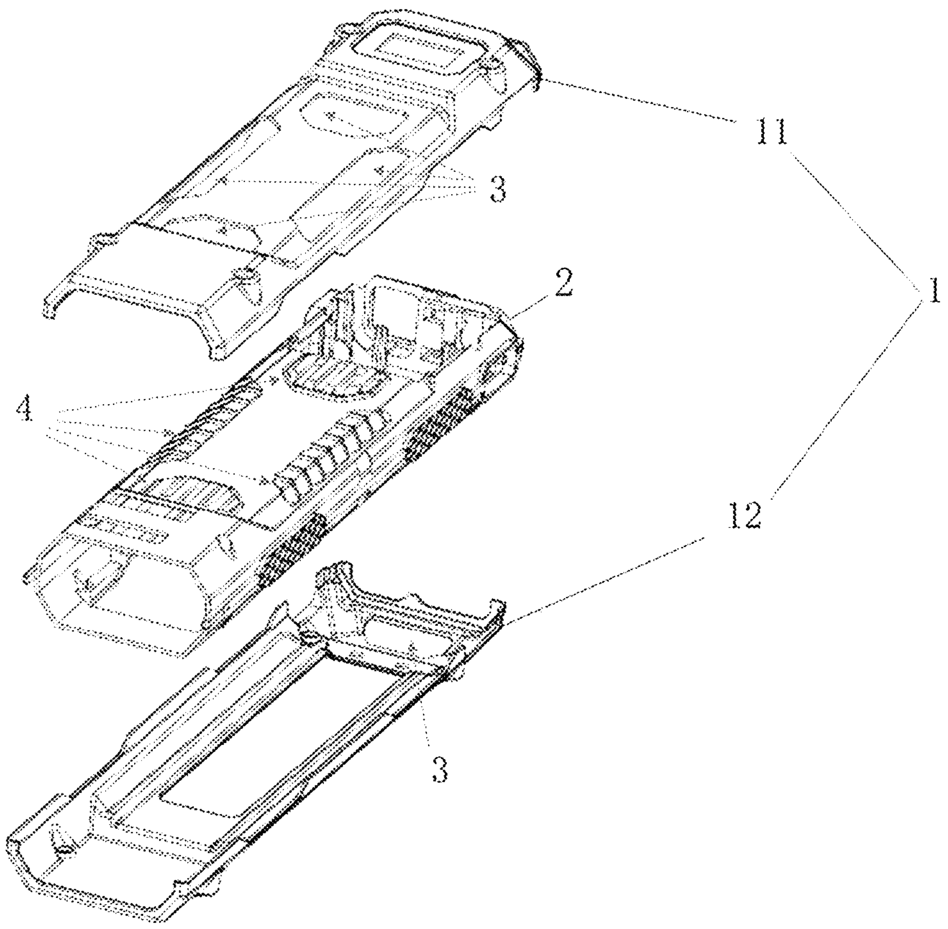
FIG. 1 is a schematic diagram of an exploded structure of a non-slip shell according to the present application.
Figure 2:
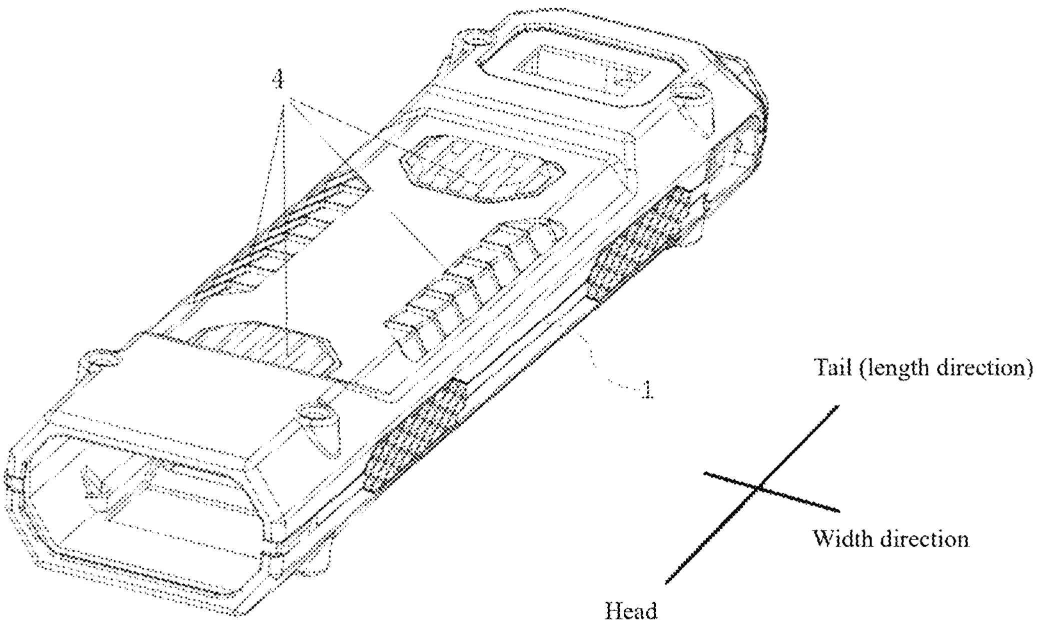
FIG. 2 is a first view of the non-slip shell according to the present application.

In view of shortcomings of the prior art, the present application provides a non-slip shell, as shown in FIG. 1 and FIG. 2. The non-slip shell includes a shell body 1, an internal structural member 2, and a protruding part 4. The shell body 1 is provided with at least one hollow hole 3. The internal structural member 2 is configured to be arranged in the shell body 1, and assembly between the internal structural member 2 and the shell body 1 is detachable assembly. The protruding part 4 is disposed on the internal structural member 2 and is in one-to-one correspondence with the hollow hole 3. A portion of the protruding part 4 protrudes from the hollow hole 3 and protrudes relative to an outer surface of the shell body 1.

Figure 5:
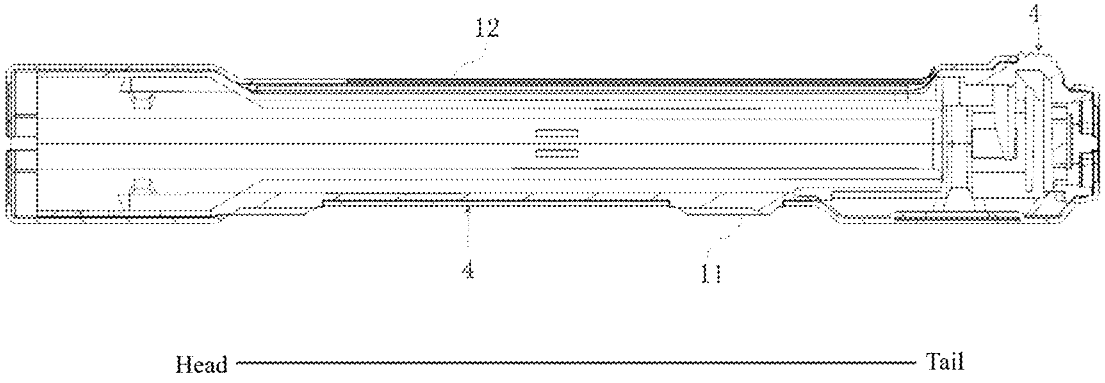
FIG. 5 is a second view of the non-slip shell according to the present application.

Specifically, the protruding part 4 is connected to the internal structural member 2, and the hollow hole 3 is provided in the shell body 1. After the internal structural member 2 and the shell body 1 are assembled, the protruding part 4 may be corresponding to the hollow hole 3 and extend outward from the hollow hole 3 beyond the outer surface of the shell body 1 (as shown in FIG. 5), thus providing non-slip performance. Connection between the protruding part 4 and the internal structural member 2 is detachable connection or firm connection. When the connection between the protruding part 4 and the internal structural member 2 is the firm connection, the protruding part 4 and the internal structural member 2 may be an integrally formed structure.

When a user holds the shell body 1, a hand can contact an exposed portion of the protruding part 4, thereby increasing a friction force between the hand and the shell body 1, making it easier for the user to firmly hold the shell body 1, helping to reduce a risk of accidental sliding or out-of-control, and improving overall safety of a surface of a portable lighting device.

Because the protruding part 4 is not easily processed for the shell body 1, in the present application, the protruding part 4 for a non-slip purpose is disposed on the internal structural member 2, and the internal structural member 2 cooperates with the shell body 1, so that the protruding part 4 can be exposed from the corresponding hollow hole 3 and arranged in a protruding way after the internal structural member 2 and the shell body 1 are assembled, thus achieving the non-slip purpose. In the present application, because it is not necessary to process the protruding part 4 of the shell body 1, a process difficulty is reduced, helping to expand a production scale and improving non-slip performance.

In an embodiment of the present application, the internal structural member 2 is a plastic internal structural member and is implemented by an injection molding process, better helping to manufacture the protruding part 4 on the internal structural member 2. For example, the protruding part 4 is manufactured into a shape that is easily held by the user, to improve the user's sense of entire control over the shell body 1, so that the user can control the portable lighting device more accurately, to maintain stability of holding without excessive efforts.

In an embodiment of the present application, the internal structural member 2 includes a middle frame.

In an embodiment of the present application, the shell body 1 is a metal shell body. The metal shell body 1 is made by a stamping process, to ensure texture and holding comfort of an outer surface of the metal shell body 1.

The shell body 1 includes a front shell 11 and a rear shell 12. The rear shell 12 matches the front shell 11 to form accommodating space. The internal structural member 2 is located in the accommodation space. Either the front shell 11 or the rear shell 12 is provided with at least one hollow hole 3.

Correspondingly, a side that is of the internal structural member 2 and that is close to the front shell 11 is provided with at least one protruding part 4, and a side that is of the internal structural member 2 and that is close to the rear shell 12 is also provided with at least one protruding part 4. In the present embodiment, the front side and the rear side of the shell body 1 are provided with the protruding parts 4, thereby improving the non-slip performance.

The front shell 11 and the rear shell 12 are an integrally formed structure, thereby improving overall structural stability of the shell body 1.

First Embodiment of the Present Application

One side that is of the internal structural member 2 and that is corresponding to the front shell 11 is provided with at least one protruding part 4 extending along a length direction of the internal structural member 2, and the protruding part 4 is close to an edge of the internal structural member 2 in a width direction.

Specifically, on the side that is of the internal structural member 2 and that is corresponding to the front shell 11, at least one protruding part 4 is arranged to extend along the length direction of the internal structural member 2. When the user holds the shell body 1 by hand, the user habitually holds an edge of the shell body 1 in the length direction. Therefore, the protruding part 4 is arranged to extend along the length direction of the internal structural member 2 and close to the edge of the internal structural member 2 in the width direction, so that when the user holds the shell body 1, the protruding part 4 more easily contacts the user's hand, and a contact area between the protruding part 4 and the user's hand may be increased as much as possible, to further improve the non-slip performance of the shell body 1.

It should be noted that the length direction of the internal structural member 2 is a direction from a head to a tail of the portable lighting device, or a direction from the tail to the head of the portable lighting device. A light source of the portable lighting device emits light towards the head.

In an implementation of the present embodiment, there are a plurality of protruding parts 4 extending along the length direction of the internal structural member 2, and every two protruding parts 4 form one group. The two protruding parts 4 are distributed along the width direction of the internal structural member 2. The width of the shell body 1 is designed to be easily held by the user with one hand. Therefore, both sides of the internal structural member 2 in the width direction are provided with the protruding parts 4, and the two protruding parts 4 are respectively close to edges of the internal structural member 2 in the width direction, so that when the user holds the shell body 1 with one hand, the two protruding parts 4 can effectively contact the palm and finger pulp of the user, thereby increasing the contact area and further improving the non-slip performance.

Second Embodiment of the Present Application

One side that is of the internal structural member 2 and that is corresponding to the front shell 11 is provided with at least one protruding part 4 extending along the width direction of the internal structural member 2. Specifically, on the side that is of the internal structural member 2 and that is corresponding to the front shell 11, at least one protruding part 4 is arranged to extend along the width direction of the internal structural member 2.

When the user holds the portable lighting device, the usually holds the shell body 1 with the palm, and a thumb of the user is close to the front shell 11 and extends along the length direction of the shell body 1. Therefore, in the present embodiment, the protruding part 4 extending along the width direction of the internal structural member 2 is disposed on the side that is of the internal structural member 2 and that is corresponding to the front shell 11, which can increase a friction force between the shell body 1 and the thumb of the user, thereby improving the non-slip performance.

In an implementation of the present embodiment, there are a plurality of protruding parts 4 extending along the width direction of the internal structural member 2, and every two protruding parts 4 form one group. The two protruding parts 4 are distributed along the length direction of the internal structural member 2, so that when the user holds the shell body 1 with one hand, no matter whether the user's thumb has a tendency to slide towards the head or the tail along the length direction, one protruding part 4 can rub and prevent the thumb from slipping, thus ensuring the non-slip performance of the shell body 1.

Third Embodiment of the Present Application

One side that is of the internal structural member 2 and that is corresponding to the front shell 11 is provided with four protruding parts 4. Among the four protruding parts 4, one group of protruding parts 4 is arranged along the width direction of the internal structural member 2, and one group of protruding parts 4 is arranged along the length direction of the internal structural member 2. In addition, the four protruding parts 4 enclose a rectangular structure.

In the four protruding parts 4 of the present embodiment, there is a gap between every two adjacent protruding parts 4, so that the hollow holes 3 corresponding to all protruding parts 4 can be arranged on the shell body 1 at intervals to ensure the overall strength of the shell body 1.

In an implementation of the present embodiment, a position that is on the front shell 11 and that is corresponding to the rectangular structure is also provided with a sink, and the hollow holes 3 corresponding to the four protruding parts 4 are all located in the sink. The sink is configured to cooperate with the user's thumb, so that the thumb can fit into the rectangular structure when the user holds the shell body 1. In addition, no matter whether the user's hand moves along the length direction or the width direction of the shell body 1, the four protruding parts 4 can provide a friction force to the user's hand, thus ensuring the non-slip performance of holding by the user.

Figure 4:
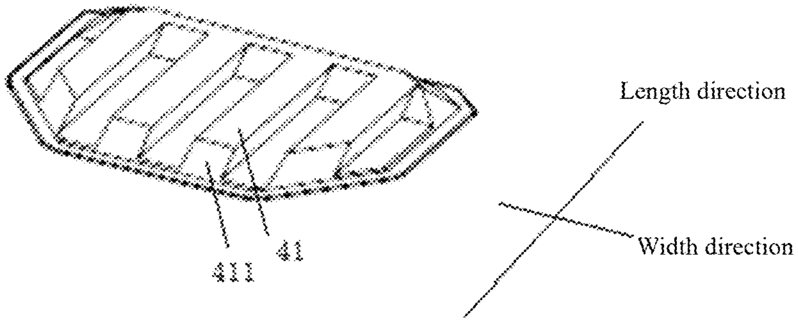
FIG. 4 is a schematic structural diagram of a protruding part formed by arrangement of a plurality of rib strips according to the present application.

Based on any of the above embodiments, a surface of the protruding part 4 is a wave-like curved surface, to prevent the non-slip performance from being decreased due to a smooth surface of the protruding part 4. A shape and structure of the protruding part 4 extending along the width direction of the internal structural member 2 may be the same as or different from a shape and structure of the protruding part 4 extending along the length direction of the internal structural member 2 (the length direction and width direction are shown in FIG. 2 and FIG. 4).

The protruding part 4 includes a plurality of V-shaped structures 40, or the protruding part 4 includes a plurality of rib strips 41. When the protruding part 4 extending along the length direction of the internal structural member 2 includes the V-shaped structures 40, a plurality of the V-shaped structures 40 are sequentially arranged along the length direction of the internal structural member 2, and every two adjacent V-shaped structures 40 partially overlap, so that a surface that is of the protruding part 4 and that contacts the user's hand forms a wave-like curved surface instead of a smooth plane. When the protruding part 4 extending along the width direction of the internal structural member 2 includes the V-shaped structures 40, a plurality of the V-shaped structures 40 are sequentially arranged along the width direction of the internal structural member 2, and every two adjacent V-shaped structures 40 partially overlap, so that a surface that is of the protruding part 4 and that contacts the user's hand forms the wave-like curved surface instead of a smooth plane.

In addition, an opening of the V-shaped structure 40 is arranged toward a direction of the rear shell 12, so that a tip of the V-shaped structure 40 is arranged toward a direction of the front shell 11, better helping the protruding part 4 to abut against user's fingers for holding, thereby increasing a friction force.

An included angle of the V-shaped structure 40 is 130°-140°, which can not only ensure the non-slip performance caused by contact with the user's hand, but also prevent the contact surface between the protruding part 4 and the user's hand from being too sharp, thus ensuring the holding comfort of the protruding part 4.

When the protruding parts 4 extending along the width direction of the internal structural member 2 include the rib strips 41, a plurality of the rib strips 41 are distributed along the width direction of the internal structural member 2, and there is a gap between every two adjacent rib strips 41. When the protruding parts 4 extending along the length direction of the internal structural member 2 include the rib strips 41, a plurality of the rib strips 41 are distributed along the width direction of the internal structural member 2, and there is a gap between every two adjacent rib strips 41.

For example, the shape and structure of the protruding part 4 extending along the width direction of the internal structural member 2 is different from the shape and structure of the protruding part 4 extending along the length direction of the internal structural member 2, and a mechanism of the protruding part 4 is described as follows.

Figure 3:
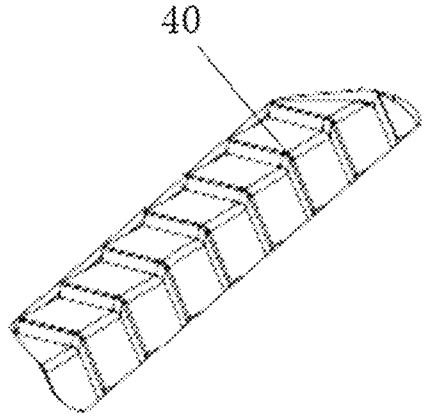
FIG. 3 is a schematic structural diagram of a protruding part formed by arrangement of a plurality of V-shaped structures according to the present application.

As shown in FIG. 3, for the protruding parts 4 extending along the length direction of the internal structural member 2, the protruding part 4 includes a plurality of V-shaped structures 40, the plurality of V-shaped structures 40 are sequentially arranged along the length direction of the internal structural member 2, and every two adjacent V-shaped structures 40 partially overlap, so that a surface that is of the protruding part 4 and that contacts the user's hand forms a wave-like curved surface instead of a smooth plane.

In addition, an opening of the V-shaped structure 40 is arranged toward a direction of the rear shell 12, so that a tip of the V-shaped structure 40 is arranged toward a direction of the front shell 11, better helping the protruding part 4 to abut against user's fingers for holding, thereby increasing a friction force.

An included angle of the V-shaped structure 40 is 130°-140°, which can not only ensure the non-slip performance caused by contact with the user's hand, but also prevent the contact surface between the protruding part 4 and the user's hand from being too sharp, thus ensuring the holding comfort of the protruding part 4.

For the protruding parts 4 extending along the width direction of the internal structural member 2, as shown in FIG. 4, the protruding part 4 includes a plurality of rib strips 41, the plurality of the rib strips 41 are distributed along the width direction of the internal structural member 2, and there is a gap between every two adjacent rib strips 41. To facilitate holding by the user, the width of the internal structural member 2 is designed to be small. Therefore, in the present application, the protruding part 4 extending along the width direction of the internal structural member 2 is designed as an integral structure including a plurality of rib strips 41, which better facilitates arrangement of the protruding parts 4 on the internal structural member 2 and simplifies a processing technology.

Based on the third embodiment, two protruding parts 4 extending along the length direction of the internal structural member 2 and two protruding parts 4 extending along the width direction of the internal structural member 2 are arranged oppositely and symmetrically. For the two protruding parts 4 extending along the width direction of the internal structural member 2, inclined surfaces 411 (as shown in FIG. 4) are provided on opposite sides, and the inclined surfaces 411 gradually rise from ends close to each other to ends away from each other, so that the protruding parts 4 provide the non-slip performance for the user's hand and reduce sharpness, further improving holding comfort of the user.

In an embodiment of the present application, because the rear shell 12 needs to be provided with structures such as a heat sink and back clip, and there is little space, only one protruding part 4 is provided on a side that is of the internal structural member 2 and that is corresponding to the rear shell 12, and the protruding part 4 is located at one end of the internal structural member 2 in the length direction, such as a tail of the internal structural member 2 (as shown in FIG. 5). When the user puts the portable lighting device into a pocket, according to a usage habit, the user inserts a head of the device downward into the pocket. Therefore, in the present embodiment, the protruding part 4 is arranged at a tail of the internal structural member 2, to facilitate user-friendly pushing down the non-slip shell with fingers through the protruding part 4, thereby preventing touching other parts at the tail by mistake when putting the non-slip shell into the pocket.

The present application further provides a portable lighting device, and the portable lighting device includes the non-slip shell as described in any one of the above, a circuit board, a power supply, and a light source. The circuit board, the power supply, and the light source are all disposed in the shell body 1, and the circuit board is electrically connected to the power supply and the light source separately.

It should be understood that applications of the present application are not limited to the above examples, and a person skilled in the art can make improvements or changes according to the above description, and all these improvements and changes shall fall within the protection scope of the appended claims of the present application.

What is claimed is:

1. A non-slip shell, comprising:

a shell body, wherein the shell body has at least one hollow hole;

an internal structural member, detachably arranged in the shell body; and a protruding part, detachably connected to the internal structural member and in one-to-one correspondence with the hollow hole, wherein a portion of the protruding part protrudes from the hollow hole and protrudes relative to an outer surface of the shell body, wherein the shell body comprises:

a front shell; and a rear shell, matching the front shell to enclose accommodating space, wherein the internal structural member is located in the accommodating space; and either the front shell or the rear shell is provided with at least one hollow hole, wherein the front shell and the rear shell are an integrally formed structure, wherein one side of the internal structural member corresponding to the front shell is provided with at least one protruding part extending along a length direction of the internal structural member, and the protruding part is close to an edge of the internal structural member in a width direction.

2. The non-slip shell according to claim 1, wherein the shell body is a metal shell body.

3. The non-slip shell according to claim 1, wherein there are a plurality of protruding parts extending along the length direction of the internal structural member, and every two protruding parts form one group; and the two protruding parts are distributed along the width direction of the internal structural member.

4. The non-slip shell according to claim 1, wherein one side of the internal structural member corresponding to the front shell is provided with at least one protruding part extending along the width direction of the internal structural member.

5. The non-slip shell according to claim 4, wherein there are a plurality of protruding parts extending along the width direction of the internal structural member, and every two protruding parts form one group; and the two protruding parts are distributed along the length direction of the internal structural member.

6. The non-slip shell according to claim 1, wherein a surface of the protruding part includes a plurality of V-shaped protrusions or a plurality of rib strips, thereby forming a wave-like curved surface.

7. A portable lighting device, comprising the non-slip shell according to claim 1.

* * * * *